Aug. 10, 1937.  A. HAAS  2,089,362
COMBINATION MACHINE TOOL
Filed March 17, 1936  4 Sheets-Sheet 1
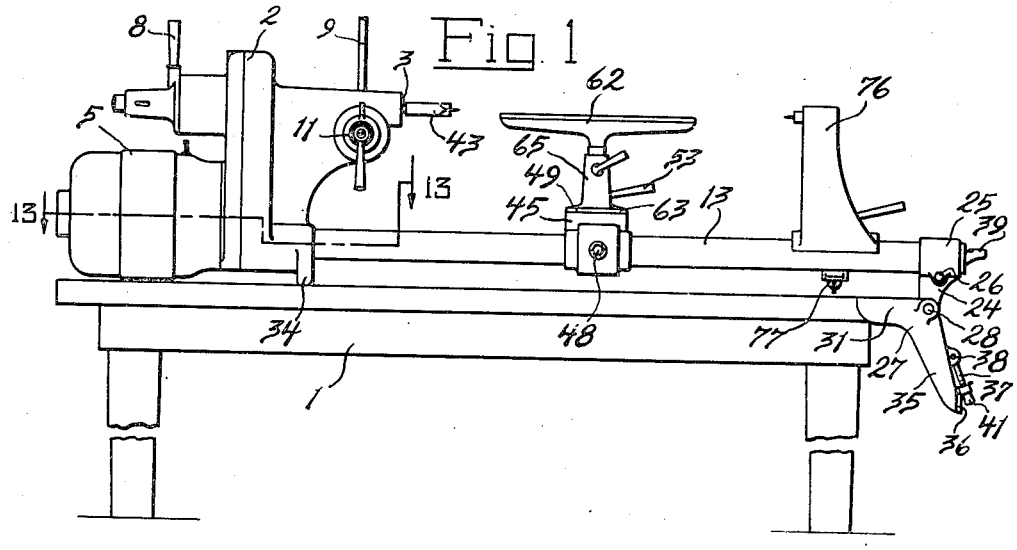
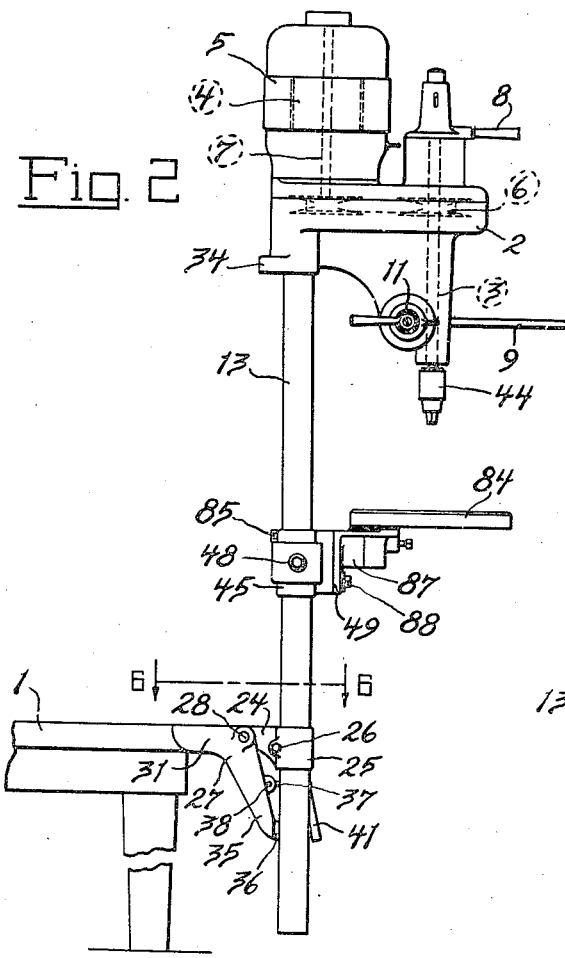
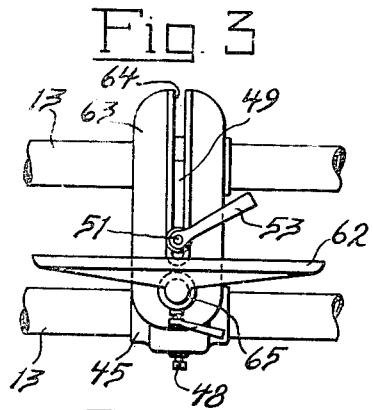
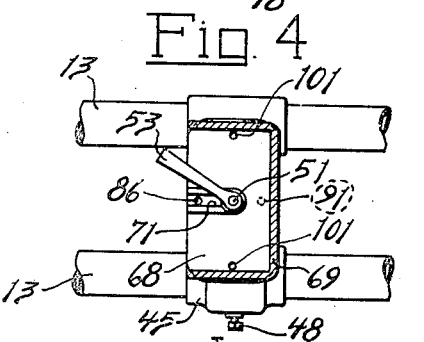
INVENTOR
ALVIN HAAS
BY Robert F. Mueller
ATTY.

Aug. 10, 1937.  A. HAAS  2,089,362
COMBINATION MACHINE TOOL
Filed March 17, 1936  4 Sheets-Sheet 2
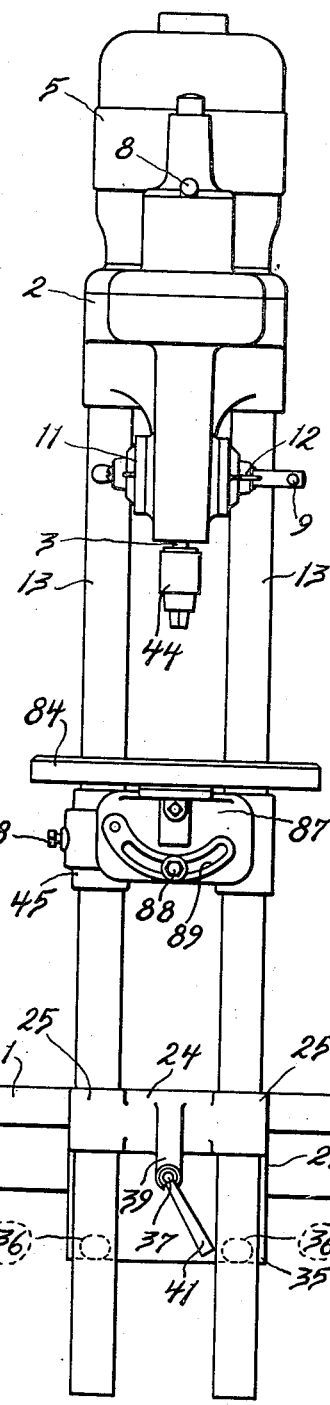
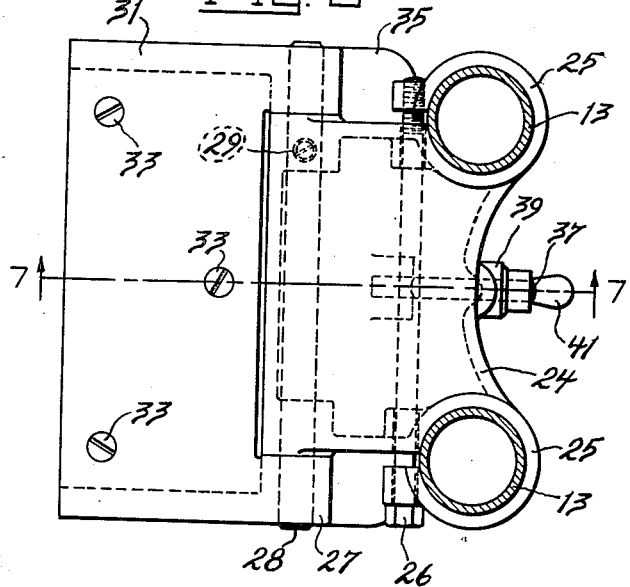
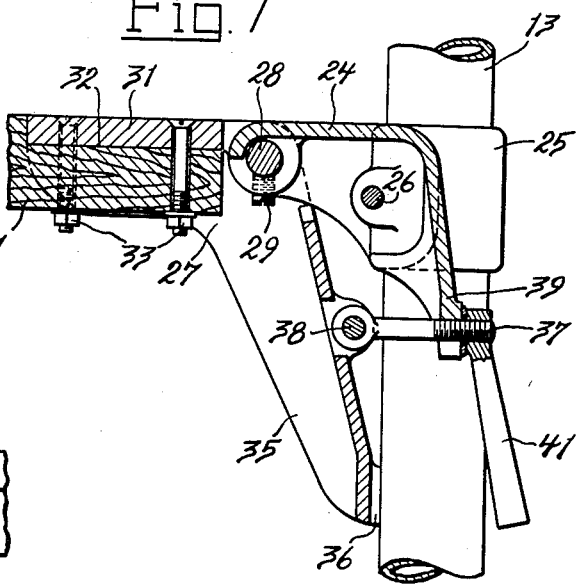
INVENTOR
ALVIN HAAS
BY
ATTY.

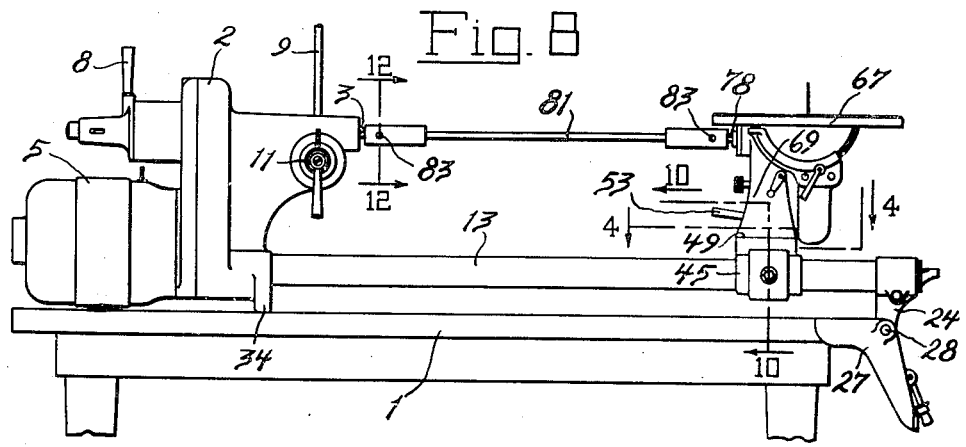
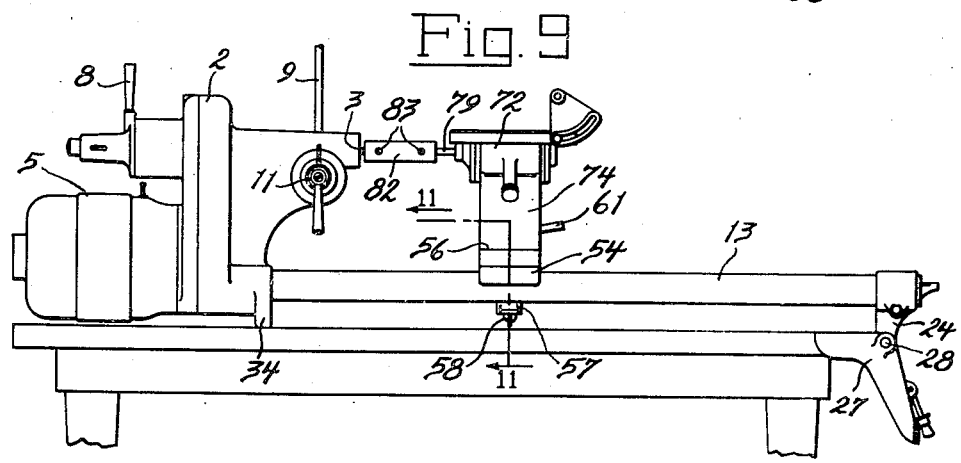
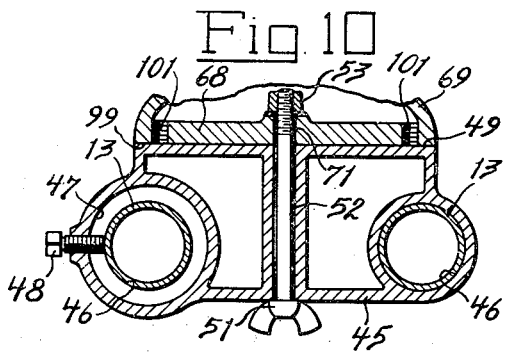
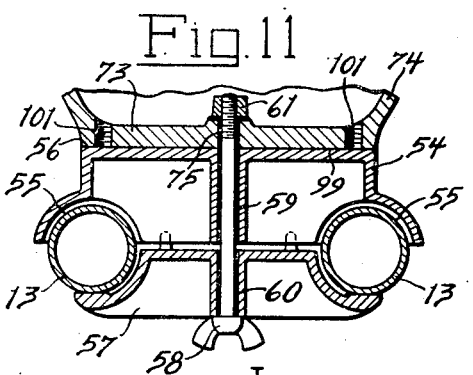
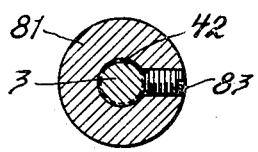

Aug. 10, 1937.    A. HAAS    2,089,362
COMBINATION MACHINE TOOL
Filed March 17, 1936.    4 Sheets-Sheet 4
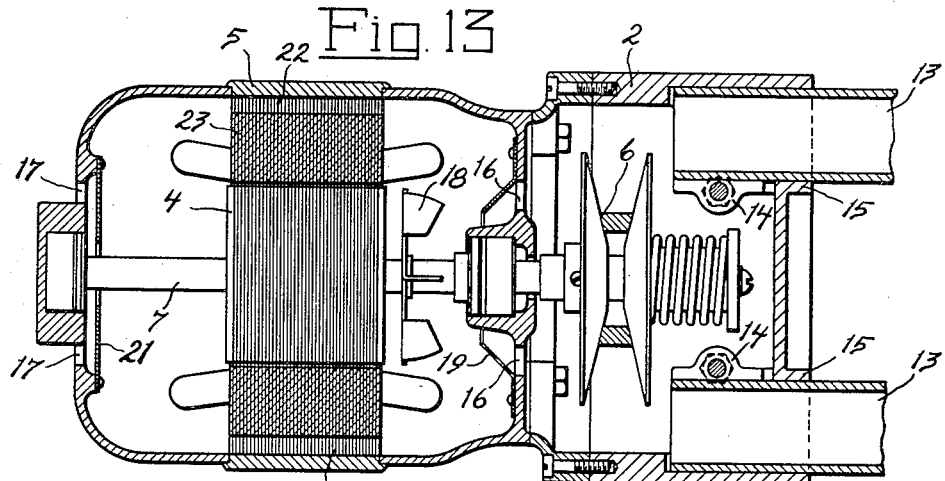
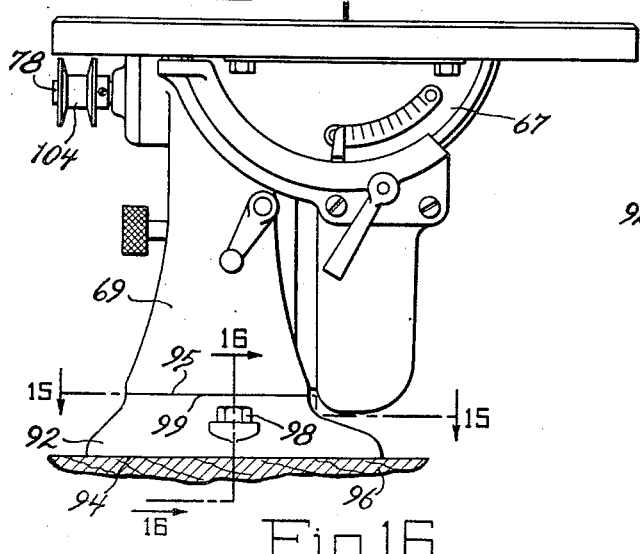
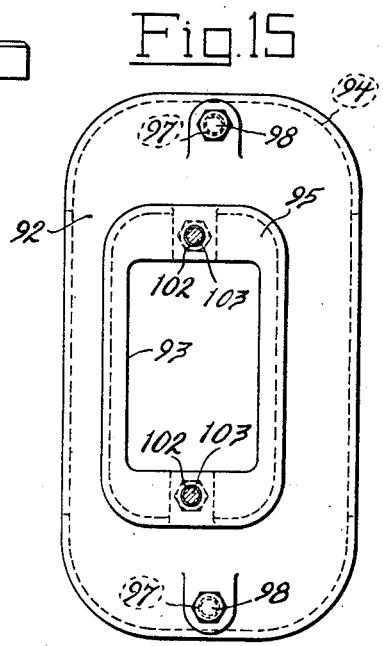
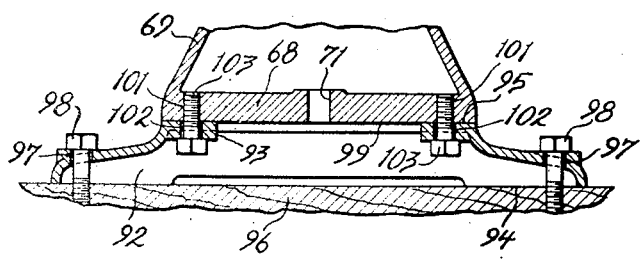
INVENTOR
ALVIN HAAS
BY Robert F. Mielke
ATTY.

Patented Aug. 10, 1937

2,089,362

UNITED STATES PATENT OFFICE 2,089,362

COMBINATION MACHINE TOOL

Alvin Haas, Peru, Ill.

Application March 17, 1936, Serial No. 69,287

22 Claims. (Cl. 29—27)

My invention relates particularly to combination wood working machines although not limited to this use alone.

The main feature of the invention resides in the provision of a practical and efficient combination machine tool which is adapted for convenient conversion by adjustment and interchange of parts to perform a variety of operations such as turning, drilling, sawing, planing, etc., the invention contemplating the provision of a compact and convenient outfit utilizing a single power head and particularly adapted for home and school use.

With this feature in view my invention consists in certain features of novelty in the construction, combination, and arrangement of parts by which the said features and certain other features, hereinafter appearing, are effected, all as fully described with reference to the accompanying drawings and more particularly pointed out in the appended claims.

In the said drawings—

Figure 1 is a side elevation of a combination machine embodying my invention and showing it arranged as a lathe;

Figure 2 is a similar view of the machine showing it arranged as a drill press;

Figure 3 is a partial top plan view of the machine as shown in Figure 1;

Figure 4 is a partial sectional view substantially on the line 4—4 of Figure 8 hereinafter described;

Figure 5 is a front elevation of the machine arranged as a drill press;

Figure 6 is a sectional view substantially on the line 6—6 of Figure 2;

Figure 7 is a sectional view substantially on the line 7—7 of Figure 6;

Figure 8 is a side elevation of the machine showing it arranged as a circular saw;

Figure 9 is a similar view of the machine showing it arranged as a planer;

Figure 10 is a partial section substantially on the line 10—10 of Figure 8;

Figure 11 is a partial section substantially on the line 11—11 of Figure 9;

Figure 12 is a section on the line 12—12 of Figure 8;

Figure 13 is a partial section substantially on the line 13—13 of Figure 1;

Figure 14 is an end elevation of a circular saw mounted independently of the machine by means of the sub-base of my invention;

Figure 15 is a sectional view on the line 15—15 of Figure 14; and

Figure 16 is partial section substantially on the line 16—16 of Figure 14.

Referring to the drawings, 1 designates a work bench or table on which the combination machine of my invention is mounted. See Figures 1 and 2. The main portion of the machine consists as follows:—

A power head is provided and consists of a hollow frame or housing 2 forming the frame of the power head, a work spindle 3 rotatably mounted in the power head, an electric motor 4, see Figures 2 and 13, arranged in parallelism with the axis of the spindle 3 and contained within a usual motor housing 5 which is secured to and continues the enclosure of the housing 2, and a variable V-belt transmission generally designated at 6 within the housing 2 and operatively connecting the motor shaft 7 with the spindle 3 for driving the same.

The V-belt transmission is adjusted for various speeds by means of a control 8 on the housing, and the spindle 3 is slidable longitudinally for drilling and like purposes and its longitudinal movement is controlled through the medium of a feed handle 9 and a limit stop device 11 and a locking device 12, all as fully described and claimed in my co-pending application for United States Letters Patent, Serial No. 81,495, filed May 23, 1936, for improvement in Machine tool.

Forming an extension on the housing 2 is a pair of parallel tubes 13 having ends thereof clamped, as designated at 14, see Figure 13, in sockets 15 in the housing 2. The tubes 13 are thus rigidly secured with the housing 2 and extend therefrom in parallelism with the spindle 3, the tubes communicating with the interior of the housing to form an air vent therefor.

The motor housing 5 communicates with the interior of the housing 2 by means of openings 16 through the inner end wall thereof, and the outer end wall of the motor housing is provided with vent openings 17. See Figure 13. An air impeller 18 is secured on the motor shaft 7. The openings 16 are baffled by a baffle plate 19, and the openings 17 are baffled by a baffle plate 21.

Air is drawn through the tubes 13 into the housing 2, then through the openings 16 into the inner portion of the motor housing, then through openings 22 through the field element 23 of the motor and out of the motor housing through the openings 17, the tubes 13 conveniently serving as an extended air vent for the housing 2 and motor housing 5.

A pivot member 24 is provided with split bored formations 25 which are slidably engaged on the tubes 13. See Figures 1, 2, 6 and 7. The member 24 thus bridges the tubes 13 and ties them together remote from the housing 2, and a headed screw 26 serves to clamp the formations 25 on the tubes 13 to secure the member 24 in adjusted position on these tubes.

A second pivot member 27 is pivotally connected with the member 24 on an axis transverse to the axial plane of the tubes 13 by means of a pivot pin 28 passing through bores though the members 24 and 27 and secured with the member 24 by a set screw 29.

The member 27 is angular in shape and one wing 31 thereof is adapted to be secured downwardly into a recess 32 at one end of the top of the bench or table 1 by means of bolts 33, see Figures 6 and 7, the pivot pin 28 being thus disposed horizontally for pivotal movement of the machine from a horizontal position overlying the bench or table 1, as shown in Figures 1, 8 and 9, to a vertical position at the end of the bench or table 1, as shown in Figures 2 and 5, the housing member 2 being provided with a foot 34 adapted to rest on the bench or table 1 to predetermine the horizontal position of the machine.

In the horizontal position of the machine, it may serve as a lathe, and, in order to utilize the maximum length of the tubes 13 without interference from the pivot member 24, this pivot member is adjusted to the extreme outer ends of the tubes 13 which form the bed of the machine in this position.

When the machine is positioned vertically to serve say as a drill press, the pivot member 24 is secured on the tubes 13 at a place inwardly from their outer ends, as shown in Figures 2 and 5, so that in this vertical position the tubes 13 project below the member 24, this adjustment of the member 24 serving for conveniently positioning the power head vertically.

Another wing of the pivot member 27 extends downwardly from the pivot pin 28, and is provided with stop bosses 36 alined with the tubes 13 and against which the tubes 13 engage to predetermine the vertical position of the machine. See Figures 2, 5 and 7.

A clamp screw 37 is pivotally mounted on a horizontal axis, as designated at 38, on the intermediate portion of the wing 35 of the pivot member 27, and the pivot member 24 is provided with a slotted extension 39 into which the screw 37 is engaged in the vertical position of the machine, and a handle nut 41 is screwthreaded on the screw 37 to releasably secure the machine in its said vertical position.

The projecting end of the work spindle 3 is threaded, as shown at 42 in Figure 12 for the interchangeable mounting thereon of various devices, as a lathe drive center 43, see Figure 1, or a drill chuck 44, see Figures 2 and 5.

In the several purposes of the machine various devices or tools are mounted on the tubes 13 which serve as the lathe bed and the drill press column as the case may be, and in order to facilitate the interchange of such devices suitable mountings are provided which will now be described.

One such mounting consists of a support 45 provided with parallel bores 46 therethrough by means of which the support is slidably engaged on the tubes 13, the support thus bridging the tube. See Figures 1 to 5, 8 and 10. The intermediate portion of one of the bores 46 is enlarged, as designated at 47, and a set screw 48, screwthreaded through the wall of this enlarged bore portion, serves to releasably secure the support in adjusted position along the tubes 13.

The support member 45 is provided with a mounting surface 49 disposed parallel to and facing the axis of the work spindle 3, and a wing headed screw 51 passes through an intermediate bore 52 through the member 45 and is disposed normal to the surface 49 and centrally thereof. The head of the screw 51 is disposed remote from the surface 49, and a handle nut 53 is screwthreaded on this screw above the surface 49.

Another such mounting consists of a support member 54 provided with parallel channel formations 55 by means of which the support is slidably engaged on the tubes 13, the support thus bridging the tubes. See Figures 9 and 11. The support member 54 is provided with a mounting surface 56 disposed parallel to and facing the axis of the work spindle 3. A clamp member 57 engages and bridges the tubes 13 oppositely with reference to the member 54, and a wing headed screw 58 passes through registering intermediate bores 59 and 60 through the members 54 and 57 and disposed normal to the surface 56 and centrally thereof. The head of the screw 58 is disposed at the clamp member 57, and a handle nut 61 is screwthreaded on this screw above the surface 56 for clamping the members 54 and 57 on the tubes and for another purpose hereinafter appearing.

These two mountings may be used interchangeably, the mounting shown in Figure 11 being quickly detachable from the tubes 13. The mounting surfaces 49 and 56 of these mountings are disposed equidistant from the axis of the work spindle 3 and various devices or tools are interchangeably mountable thereon as will now be described.

In Figures 1 and 3, a tool rest 62 is shown mounted on the mounting of Figure 10 and having a base consisting of a base portion 63 provided with a securing slot 64 extending inwardly from the margin thereof and a standard portion 65 uprising from said base portion. In the mounting of the tool rest the base is engaged on the mounting surface 49 with the slot 64 embracing the screw 51 and the nut 53 is tightened downwardly on the base, the wing head of the screw facilitating manipulation.

In Figures 4, 8 and 10, a circular wood saw unit 67 is shown mounted on the mounting of Figure 10. The base of this unit comprises a base portion 68 and an open sided standard portion 69 uprising marginally therefrom. The base portion 68 is provided with a securing slot 71 extending inwardly from the margin portion thereof, corresponding with the open side of the standard portion, to a central point within the enclosure of the standard portion.

In mounting the saw unit, the base portion 68 is engaged between the mount surface 49 and the handle nut 53 and the nut tightened downwardly on the base, the wing head of the screw facilitating manipulation.

In Figures 9 and 11 a wood planer unit 72 is shown mounted on the mounting of Figure 11. The base of this unit is similar to the base of the saw unit 67 and comprises a base portion 73 and an open sided standard portion 74 uprising marginally therefrom. The base portion 73 is provided with a securing slot 75 extending inwardly from the margin portion thereof, corresponding with the open side of the standard portion, to a central point within the enclosure of the standard portion.

The planer unit mounts similarly to the manner in which the saw unit mounts, it being noted that the screw 58 and its handle nut 61 serves both to clamp the support member 54 on the tubes 13 and to secure the planer unit on the mount surface 56.

Where the machine is used as a lathe a tail stock 76 is provided, which is detachably mounted on the tubes 13 by a structure, generally designated at 77, and similar to the support structure of Figure 11. See Figure 1.

The saw unit 67 is provided with a usual shaft 78 and the planer unit is provided with a usual shaft 79, and the dimensions of these units or any similar units that may be used interchangeably therewith are such that their shafts aline with the spindle 3 when the units are mounted on the machine, the shafts of the units being coupled with the spindle so that they are driven therefrom.

In Figure 8 an extended coupling shaft 81 is shown coupling the spindle 3 with the shaft 78 of the saw unit, and in Figure 9 a short coupling shaft 82 is shown coupling the spindle 3 with the shaft 79 of the planer unit. The ends of these coupling shafts 81 and 82 are bored to engage the spindle 3 and the shafts of the units and are provided with set screws 83 to provide the drive coupling. See Figures 8, 9 and 12.

When the machine is used in its vertical position, say as a drill press, a work table 84 is detachably mounted on one of the mounting units, such as the one of Figures 4 and 10, by means of a headed screw 85 passing through a bore 86 through the support 45 and screwthreaded into a mounting part 87 of the work table and a second headed screw 88 passing through a segmental slot 89 through the mounting 87 and screwthreaded into a bore 91 in the support 45, the axis of the slot 89 being coincident with that of the screw 85 to permit tilting adjustment of the work table. See Figures 2, 4 and 5.

In order that the various tool units may be properly mounted independently of the machine, the following is provided:—

The base portions of the several tool units are conveniently small though adequate in extent for mounting on the supports of the machine as shown in Figures 10 and 11.

To provide an adequate support for the tool units when mounted independently of the machine, say on a bench top, I have provided a sub-base which will now be described by reference to Figures 14, 15 and 16.

This sub-base is indicated at 92, and is in the form of dish like formation provided with a generally central opening 93, and is provided with oppositely facing mounting surfaces 94 and 95. The upper mounting surface 95 embraces a lesser areal extent than the lower mounting surface 94, the lower mounting surface being of sufficiently large areal extent to be adequately supported on a wood bench top 96. The sub-base is provided with oppositely disposed screw openings 97 therethrough disposed without the extent of the upper mounting face 95 for the reception of headed screws 98 to secure the sub-base on a support such as the bench top 96.

The areal extents of the mounting faces of the base portions of the tool units, indicated at 99 in Figures 14 and 16 which illustrate the saw unit 67 mounted on the sub-base 92, are preferably co-extensive with the upper or smaller mounting face 95 of the sub-base, and the base portions of the several tool units are provided with oppositely disposed threaded screw holes 101 therethrough which are disposed on opposite sides of the securing slots of the base portions of the tool units, such as the slot 71, and in a plane parallel to the margin portion of the base portion of the tool unit from which the securing slots extend.

The sub-base 92 is provided with additional screw-holes 102 therethrough which register with the screw holes 101 of the tool unit base whereby the tool unit may be secured on the mounting surface 95 of the sub-base by means of headed screws 103. Where the tool units are mounted on the sub-base their shafts may be driven by means of pulleys 104 detachably secured on their shafts. See Figure 14.

Having thus described my invention, I do not wish to be limited to the precise details described as changes may be readily made without departing from the spirit of my invention, but having thus described my invention, I claim as new and desire to secure by Letters Patent the following:

1. In a device of the character described the combination with a frame carrying a rotatable work spindle and provided with an extension extending therefrom in correspondence with the axis of said work spindle, and mounting means for said frame and extension comprising means for selectively positioning said frame and extension angularly on an axis transverse to the axis of said work spindle and means for selectively positioning said frame and extension with reference to said mounting means axis and longitudinally of the axis of said work spindle.

2. In a device of the character described the combination with a frame carrying a rotatable work spindle and provided with an extension extending therefrom in correspondence with the axis of said work spindle, and mounting means for said frame and extension and comprising pivotally connected members and a connection between one of said pivotally connected members and said extension adapted to permit selective positioning of said frame and extension with reference thereto longitudinally of said extension.

3. In a device of the character described the combination with a frame carrying a rotatable work spindle and provided with an extension extending therefrom in correspondence with the axis of said work spindle, and mounting means for said frame and extension comprising pivotally connected members and a slide bearing engagement between one of said pivotally connected members and said extension providing relative longitudinal movement of said extension with the pivotal axis of said pivotally connected members disposed transversely to that of said work spindle.

4. In a device of the character described the combination with a frame carrying a rotatable work spindle and provided with an extension extending therefrom in parallelism with the axis of said work spindle, mounting means for said frame and extension comprising pivotally connected members and a slide bearing engagement between one of said pivotally connected members and said extension providing relative longitudinal movement of said extension with the pivotal axis of said pivotally connected members disposed transversely of that of said work spindle, and releasable means for fixing said bearing engagement in selected position on said extension.

5. In a device of the character described the combination with a frame carrying a rotatable work spindle and provided with an extension extending therefrom in correspondence with the axis of the work spindle, mounting means for said frame and extension comprising pivotally connected members and a slide bearing engagement between one of said pivotally connected members and said extension providing relative longitudinal movement of said extension with the pivotal axis of said pivotally connected members disposed transversely of that of said work spindle, releasable means for fixing said bearing engagement in selected position on said extension, a stop formation on the other of said pivotally connected members adapted to be engaged by said extension, and releasable clamping means operative between said pivotally connected members for clamping said extension against said stop.

6. In a device of the character described the combination with a frame carrying a rotatable work spindle and provided with an extension extending therefrom in parallelism with the axis of said work spindle, mounting means for said frame and extension comprising pivotally connected members and a slide bearing engagement between one of said pivotally connected members and said extension providing relative longitudinal movement of said extension with the pivotal axis of said pivotally connected members disposed transversely of that of said work spindle, releasable means for fixing said bearing engagement in selected position on said extension, the other of said pivotally connected members comprising two angularly disposed wings one of which is adapted to be secured on a work bench with the aforesaid pivotal axis disposed horizontally and with the other of said wings projecting downwardly and providing a stop engaged by said extension in the vertical position of said frame and extension, and releasable clamping means operative between said pivotally connected members for clamping said extension against said stop.

7. In a device of the character described the combination with a frame carrying a rotatable work spindle and provided with an extension extending therefrom in parallelism with the axis of said work spindle and comprising two parallel shaft like members, mounting means for said frame and extension comprising pivotally connected members and split bored formations on one of said pivotally connected members and engaged on said shaft like members for relative sliding movement with the pivotal axis of said pivotally connected members disposed transversely of that of said work spindle, a single screw means for clamping said split bored formations on said shaft like members, the other of said pivotally connected members comprising two angularly disposed wings one of which is adapted to be secured on a work bench with the aforesaid pivotal axis disposed horizontally and with the other of said wings projecting downwardly and providing a stop engaged by said shaft like members in the vertical position of said frame and extension, and releasable clamping means operative between said first mentioned pivotally connected member and said downwardly projecting wing for clamping said shaft like members against said stop.

8. In a device of the character described the combination with a power head comprising a frame carrying an electric motor and a rotatable work spindle driven thereby, of an extension on said frame and extending therefrom in parallelism with the axis of said work spindle, and pivot mounting means for said frame and extension and associated with said extension and having its axis disposed transversely of said work spindle whereby said frame and extension may be selectively positioned with said work spindle in several angular positions, said pivot mounting means including securing means engaging said extension and adapted to be releasably fixed therewith at different points therealong.

9. In a device of the character described the combination with a power head comprising a frame carrying an electric motor and a rotatable work spindle driven thereby, of an extension on said frame and extending therefrom in parallelism with the axis of said work spindle, pivot mounting means for said frame and extension and associated with said extension and having its axis disposed horizontally and transversely of said work spindle whereby said frame and extension may be selectively positioned with said work spindle in substantially horizontal and vertical positions, said pivot mounting means including securing means engaging said extension and adapted to be releasably fixed therewith at different points therealong, and a releasable securing device associated with said pivot mounting for securing said frame and extension with said work spindle in at least one of said positions.

10. In a device of the character described the combination with a housing carrying a rotatable work spindle, of spindle driving means within said housing, and an extension on said housing and extending therefrom in parallelism with the axis of said work spindle and comprising at least one tube member communicating with the interior of said housing to provide an air vent for the housing.

11. In a device of the character described the combination with a housing carrying a rotatable work spindle, of spindle driving means within said housing, an extension on said housing and extending therefrom in parallelism with the axis of said work spindle and comprising at least one tube member communicating with the interior of said housing to provide an air vent therefor, an air impeller within said housing and driven with said spindle driving means, and said housing being provided with an additional air vent whereby said air impeller induces an air current through said housing.

12. In a device of the character described the combination with a housing carrying a rotatable work spindle of an electric driving motor carried within said housing for driving said spindle, an extension on said housing and extending therefrom in parallelism with the axis of said work spindle and comprising at least one tube member communicating with the interior of said housing to provide an air vent therefor, an air impeller within said housing and driven by said motor, and said housing being provided with an additional air vent whereby said air impeller induces an air current through said housing.

13. In a device of the character described the combination with a housing carrying a rotatable work spindle, of an electric driving motor carried within said housing on an axis parallel to that of the work spindle, a belt and pulley transmission within said housing for driving the work spindle from the motor, an extension on said housing and extending therefrom in parallelism with the axis of said work spindle and comprising at least one tube member communicating with the interior of said housing to provide an air vent therefor, an air impeller within said housing and driven by said motor, and said housing being provided with an additional air vent disposed at the end of the motor opposite that on which said first mentioned air vent is disposed.

14. An implement base of the character described comprising a base portion and an open sided hollow standard portion uprising therefrom, and said base portion being provided with a securing slot extending inwardly from the margin portion thereof, corresponding with the open side of said standard portion, to a point within the enclosure of said standard portion.

15. An implement base of the character described comprising a base portion and an open sided hollow standard portion uprising marginally therefrom, and said base portion being provided with a securing slot extending inwardly from the margin portion thereof, corresponding with the open side of said standard portion, to a central point within the enclosure of said standard portion.

16. An implement base of the character described comprising a base portion and a standard portion uprising therefrom, and said base portion being provided with a securing slot extending inwardly from the margin thereof and further provided with an additional securing formation.

17. An implement base of the character described comprising a base portion and an open sided hollow standard uprising marginally therefrom, and said base portion being provided with a securing slot extending inwardly from the margin portion thereof, corresponding with the open side of said standard, to a point within the enclosure of said standard and further provided with an additional securing formation comprising screw holes in said base portion and disposed on opposite sides of said slot.

18. An implement base of the character described comprising a base portion and an open sided hollow standard uprising marginally therefrom, and said base portion being provided with a securing slot extending inwardly from the margin portion thereof, corresponding with the open side of said standard, to a central point within the enclosure of said standard and further provided with an additional securing formation comprising screw holes in said base portion and disposed on opposite sides of said slot and in a plane parallel to said margin portion and passing through the inner end portion of said slot.

19. In a sub-base structure the combination of a sub-base provided with oppositely facing mounting faces one of which faces embraces a lesser areal extent than the other, and securing means adapted for detachably securing said sub-base on a support with the larger mounting face thereof engaged against said support and for detachably securing an implement base, having a mounting face embracing a relatively small areal extent, on the smaller mounting face of said sub-base.

20. In a sub-base structure the combination of a sub-base provided with oppositely facing mounting faces one of which faces embraces a lesser areal extent than the other, securing means disposed without the extent of the smaller mounting face of said sub-base adapted for detachably securing said sub-base upon a support with the larger mounting face thereof engaged against said support, and a second securing means disposed within the extent of the smaller mounting face of said sub-base adapted for detachably securing an implement base, having a mounting face embracing an areal extent corresponding with said smaller mounting face of said sub-base, on the smaller mounting face of said sub-base.

21. A sub-base of inverted dish like formation providing oppositely facing mounting faces one of which faces embraces a lesser areal extent than the other, said sub-base being provided with screw openings therethrough for securing the sub-base on a support with the larger mounting face thereof engaged against said support and for securing an implement base, having a mounting face embracing a relatively small areal extent, on the smaller mounting face of said sub-base.

22. A sub-base of inverted dish like formation providing oppositely facing mounting faces one of which faces embraces a lesser areal extent than the other, said sub-base being provided with screw openings therethrough disposed without the extent of the smaller mounting face thereof for securing said sub-base upon a support with the larger mounting face thereof engaged against said support, and said sub-base being provided with additional screw openings within the extent of the smaller mounting face thereof for securing an implement base, having a mounting face embracing an areal extent corresponding with the smaller mounting face of said sub-base, on the smaller mounting face of said sub-base.

ALVIN HAAS.